Figure 1:
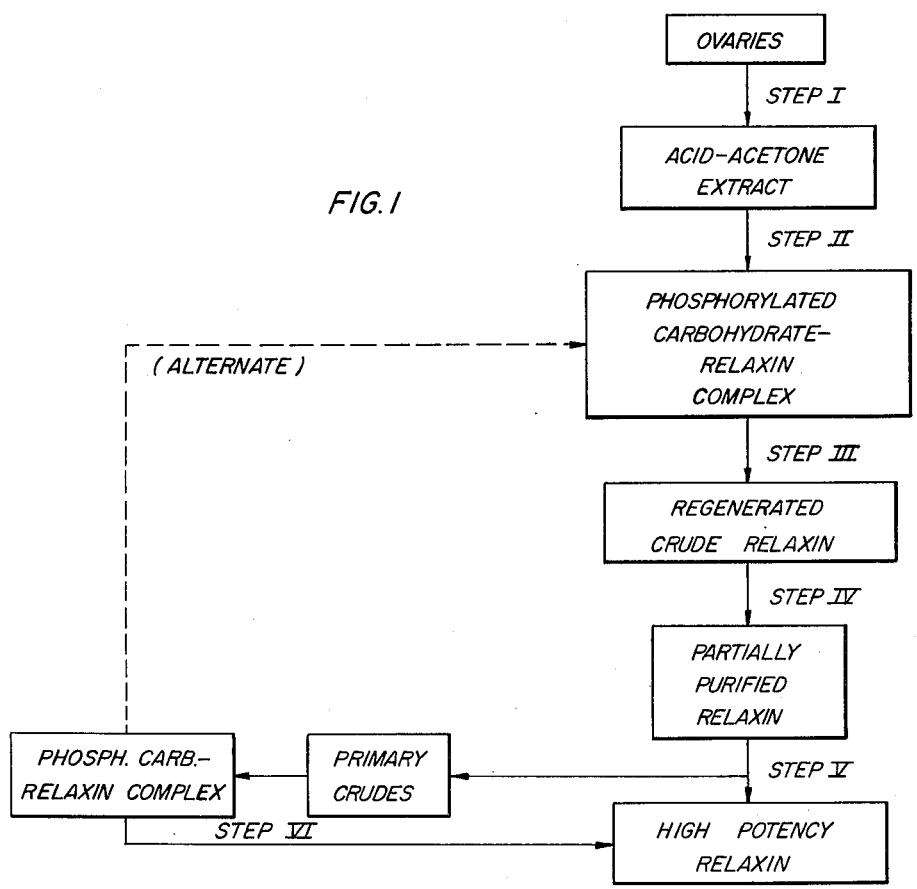
Figure 2:
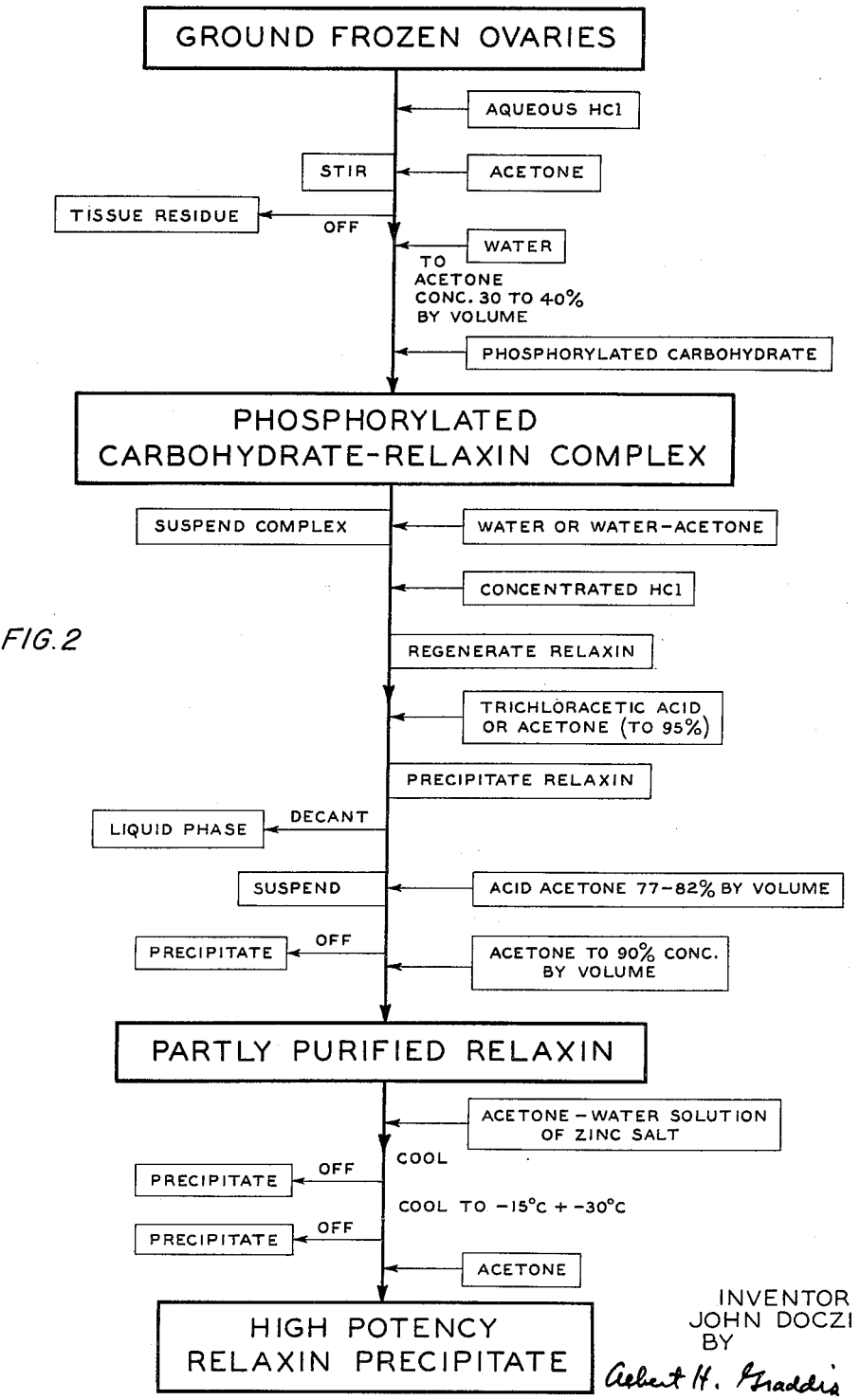

July 2, 1963  J. DOCZI  3,096,246
PROCESS FOR THE EXTRACTION AND PURIFICATION OF RELAXIN
Filed May 24. 1960  2 Sheets-Sheet 1

INVENTOR.
JOHN DOCZI
BY *Albert H. Graddis*
ATTORNEY

July 2, 1963  J. DOCZI  3,096,246
PROCESS FOR THE EXTRACTION AND PURIFICATION OF RELAXIN
Filed May 24, 1960  2 Sheets-Sheet 2

INVENTOR
JOHN DOCZI
BY
Albert H. Graddis
ATTORNEY

3,096,246
**PROCESS FOR THE EXTRACTION AND
PURIFICATION OF RELAXIN**
John Doczi, Morristown, N.J., assignor to Warner-Lambert Pharmaceutical Company, Morris Plains, N.J., a corporation of Delaware
Filed May 24, 1960, Ser. No. 31,371
46 Claims. (Cl. 167—74)

This invention relates to relaxin and in particular to a new and novel process for the extraction of relaxin and for the purification of the extract to yield a high potency relaxin product in good yields.

Relaxin is present in the ovaries of animals and may be extracted therefrom. It is believed to be a hormone of pregnancy and has aroused great interest in the field of medical research. For instance, it has been known to cause uterine cervix relaxation in cows; to increase the dilatability of the uterine cervix in ovariectomized estrogen-primed hogs; to cause definite milk let-down in sheep and to a lesser extent in cows, and to cause marked lobulo-alveolar growth of the mammary gland of a rat; and, in the clinic, it has been found to cause dilation of the uterine cervix in near-term pregnant women who fail to dilate after injections of pitocin and to stop premature labor in certain female patients allowing them to go to term.

The biological activity of relaxin is customarily expressed in guinea pig units, or G.P.U., as G.P.U./ml. in the case of a solution or G.P.U./mg. in the case of a powdered preparation The measurement of activity expressed as G.P.U. is determined by manual palpation of the pelvis. An electrometric method for assay is described by Catchpole et al. (Endocrinology, 8, 377 (1952); Biochem. Biophys. Acta., 8, 575, footnote p. 576 (1952)). Other in vivo assays are described by Kroc, R. L., V. L. Beach, N. R. Stasilli, Fed. Proc. Abs. 367, pp. 113—114 (1956), Kroc, R. L., B. G. Steinetz, V. L. Beach, N. R. Stasilli, Program of the Endocrine Society Abst. 123, pp. 77–78 (1956). An in vitro method is described by Sawyer et al. (Am. J. Physiology, 172, 547, (1953)). A recent assay technique known as the mouse ligament assay is described by R. L. Kroc, B. G. Steinetz and V. L. Beach, Ann. of N.Y. Acad. Sci. 75, 952–982 (1959).

The amount of the active relaxin fraction in ovaries is extremely small, and a complex extraction and purification process is required in order to obtain relaxin in sufficient purity for administration to patients. The relaxin content of ovaries is generally considered to be a function of the stage of pregnancy of the animal. It can vary from as low as 1,000 to as high as 200,000 G.P.U./pound of ovaries, corresponding to 0.002–0.45 G.P.U./mg. Relaxin for use in preparing suitable dosage forms for administration to patients should normally have a potency of at least 100 G.P.U./mg., which indicates the high degree of concentration required in the extraction and purification process.

The extraction and purification methods of the prior art have been characterized by the fact that the relaxin is recovered in comparatively low yields, that is only a small portion of the relaxin present in the ovaries extracted is actually recovered in the finished product. This has resulted in a high cost per unit of relaxin, this involving a great expense to patients undergoing treatment.

The exact chemical structure of relaxin has not been established although it is known that relaxin contains nitrogen. A serious problem in the purification of crude relaxin extracted from ovaries is the separation of relaxin from nitrogenous impurities which have no activity. The presence of these inactive impurities in the finished product reduces the effective relaxin activity in the finished product, and means that larger quantities of the product must be administered to patients to obtain a desired biological effect than if the product were free from impurities. This increases the possibility of adverse side effects.

It is an object of the present invention to provide a method for the recovery of relaxin from ovaries at high yields.

It is a further object of this invention to provide a method for purifying crude relaxin to yield a product having a high biological activity and free from inactive impurities.

A still further object of this invention is to provide an integrated process for the extraction of relaxin from ovaries, and the purification of the extract to recover a high potency relaxin product at high yields.

Other objects and the advantages of this invention will become apparent from the following detailed description.

The aforesaid objects are fulfilled in a new and novel manner by an integrated process involving the steps of extracting ovaries with dilute aqueous acid followed by extraction with acetone, precipitation of the relaxin from the extract as a phosphorylated carbohydrate-relaxin complex, regeneration of relaxin from the complex as crude relaxin, purification of the crude relaxin by a purification process comprising acid-acetone fractionation and fractional precipitation of a relaxin complex with zinc. It is a further feature of this invention that impure relaxin fractions obtained as by-products during the purification process may be further purified to enhance the over-all recovery of high potency relaxin.

By use of the method of the present invention it is possible to recover high potency relaxin with an over-all yield of 40 percent of the relaxin in the ovaries or higher, a yield far above that obtainable by any of the extraction and purification techniques of the prior art. It is also a feature of this invention that the relaxin finished product has a high biological activity indicating the efficiency of the purification method of the present invention. High potency relaxin having an activity of 175 to as high as 400 G.P.U./mg. has been obtained by the method of the invention.

The new and novel aspects of this invention reside not only in the integrated extraction and purification process, but, also in the individual process steps. The integration of the novel individual steps into an over-all process fulfills the desired objects of obtaining a high potency finished product at high yields.

The integrated extraction and purification process of this invention is illustrated in a simplified schematic form in the drawing. In order to facilitate the discussion of the method of this invention, the overall process is divided into six individual steps as shown in the drawing. Step I involves the two stage extraction of ovaries, first with aqueous acid and second with acetone to form an acid-acetone extract. Step II is the precipitation of relaxin from the acid-acetone extract as a phosphorylated carbohydrate-relaxin complex. Step III is the regeneration of crude relaxin from the complex. Step IV is the partial purification of the crude regenerated relaxin by acid-acetone fractionation. Step V is the final purification of the partially purified relaxin to yield a high potency relaxin finished product by fractionation of a relaxin complex with zinc and subsequent regeneration of the complex. In Step VI, crude relaxin fractions, denoted as primary crudes, which are obtained as by-products in Step V, are purified with return to the over-all purification process to augment the recovery of high potency relaxin finished product. The success of the purification of the primary crudes depends on the discovery that impure relaxin can be freed from impurities by fractional formation of a phosphorylated carbohydrate-relaxin complex. This technique is useful as a general method for purifying crude relaxin regardless of its source.

The method of the present invention will be described hereinafter in a discussion of the individual process steps, that is Steps I through VI as illustrated in the drawing.

STEP I—ACID-ACETONE EXTRACTION OF RELAXIN FROM OVARIES

It has now been found that relaxin can be extracted from ovaries by the steps of stirring ground ovarian tissue with aqueous mineral acid, adding acetone and separating the aqueous acid-acetone extract containing relaxin from the tissue residue. The tissue residue may be re-extracted with an aqueous acid-acetone solvent further to augment the recovery of relaxin. It has also been found that the grinding of frozen ovaries with solid carbon dioxide prior to the initial extraction is particularly desirable to insure the highest possible recovery of relaxin. The extraction method of the present invention has been found to yield substantially quantitative recovery into the extract of the relaxin present in the ovaries.

The initial grinding of frozen ovaries with solid carbon dioxide is an optional step. It has been found, however, that such grinding is particularly desirable to insure a high recovery of the relaxin present in the ovaries in the acid-acetone extract. The amount of solid carbon dioxide may be varied in the range of about 0.05 to about 0.2 pound of solid carbon dioxide per pound of ovaries. A quantity of 0.1 pound of carbon dioxide per pound of ovaries has been found to be particularly effective. Too large an amount of solid carbon dioxide is to be avoided, since it increases the possibility of the extract freezing solid during the initial extraction with aqueous acid.

The grinding of the ovaries with carbon dioxide is particularly desirable for several reasons. First, grinding of any solid material involves the liberation of a considerable amount of heat, which in the case of biological materials may prove highly detrimental. The presence of solid carbon dioxide with the frozen ovaries insures the maintenance of a low temperature during the grinding, thereby preventing any possible loss of relaxin activity. Second, the presence of solid carbon dioxide improves the operation of the grinding step and results in a finely divided tissue homogenate which facilitates the extraction process. Third, the presence of solid carbon dioxide during the grinding step insures a blanket of inert gas around the tissues, thereby preventing any possibility of loss of relaxin activity due to oxidation by air.

The finely divided ovarian tissues which may be in form of an ovarian tissue-solid carbon dioxide homogenate if the ovaries have been ground in the presence with solid carbon dioxide, are initially extracted with an aqueous mineral acid. The amount of aqueous acid used is preferably within the range of about 0.3 to about 1 pound of aqueous acid per pound of ovaries extracted. Hydrochloric acid is a particularly effective mineral acid, and the extracting aqueous acid solvent preferably has a normality of between about 1 and about 2. It has been found that a quantity of about 0.5 pound of 1.6 normal hydrochloric acid per pound of ovaries is particularly effective.

The finely divided tissues are stirred with the aqueous acid extraction solvent for a length of time sufficient to insure complete contact of all portions of the tissues with the aqueous acid and to allow the tissues to become softened. During the extraction with aqueous acid the tissues become softened and loosened, and the water present in the tissues becomes released into the aqueous acid. Acetone is then added to the suspension of tissues in aqueous mineral acid in a quantity sufficient to provide a volume concentration of acetone in the liquid phase within the range of about 70 to about 85 percent. At an acetone volume concentration of less than 70 percent, a clear separation of the tissue residue from the extract becomes difficult due to the formation of an unfilterable, stable, colloidal suspension. It has been found virtually impossible to isolate a clear extract from such a suspension, even by prolonged centrifugation. If the acetone volume concentration in the liquid phase is increased above 85 percent by volume, the overall recovery of relaxin in the extract is reduced. Relaxin is insoluble in acetone, with a result that as the acetone concentration in a solvent system is raised, increasingly larger portions of the relaxin present becomes precipitated, and as a result are lost in the tissue residue. For example, with an acetone concentration of 88 percent by volume, it has been found that about one-third of the total relaxin activity present precipitates out of the extract.

The suspension of tissues in aqueous acid-acetone solvent is stirred for a period of time sufficient to insure complete and effective contact of the suspended tissue with the extracting solvent and complete extraction of the relaxin present. The mixture of aqueous acid-acetone and suspended tissue is then allowed to stand to permit the tissue residue to settle. The clear extract is then decanted from the settled tissue residue and additional extract is recovered by filtration or centrifugation.

To insure complete recovery of relaxin in the extract, the tissue residue after filtration and centrifugation may be repulped with an aqueous acid-acetone solvent system. The resulting suspension is then filtered or centrifuged to recover an additional liquid extract fraction. All the extract fractions prepared as described above are combined to form the acid-acetone extract which may then be subjected to further purification to recover the relaxin content therefrom.

The following example is included in order further to illustrate the extraction method of the present invention:

Example 1

500 pounds of frozen hog ovaries (relaxin content: 20,200 G.P.U./lb.) are ground with 50 pounds of solid carbon dioxide ("Dry Ice") in a Fitzpatrick mill using a ¼ inch screen. The resulting finely divided tissue-carbon dioxide homogenate at a temperature of $-20°$ C. is stirred into a 1.6 N HCl solution prepared by mixing 15 liters of concentrated (12 N) HCl with 100 liters of water. The homogenate is added to the aqueous acid over a period of approximately 1 hour so that the temperature of the mixture does not fall below $-5°$ C. The resulting slurry is stirred for 6 hours and then allowed to stand overnight.

The following day, a quantity of 200 gallons of acetone is added to the suspension followed by stirring for 8 hours. The mixture is again allowed to stand overnight. The following day, the clear supernatant liquid is decanted from the suspension and the tissue residue is removed by filtration. The filter cake (tissue residue) is repulped with 35 gallons of a mixture of 0.3 volumes 12 N HCl, 9.7 volumes water and 30.0 volumes acetone and the resulting suspension is filtered. The filtrates are combined with the supernatant liquid obtained by decantation to form the acid-acetone extract with a volume of 275 gallons. The relaxin content of the extract is 9.4 G.P.U./ml. or 19,600 G.P.U./lb. ovaries extracted, an activity yield of about 97 percent.

The acid-acetone extract prepared as described in Example 1 is further purified in accordance with the procedure to be described in the discussion of Step II.

The foregoing example illustrates that virtually all the relaxin present in the ovaries is recovered in the acid-acetone extract. This high recovery is established not only by a comparison of the relaxin present in the ovaries and in the acid-acetone extract, as described above, but also by assays of the tissue residue remaining after the extraction. The relaxin content of the tissue residues after a number of extractions in the manner described in Example 1 has been found to range from 2 to 5 percent of the relaxin present in the ovaries prior to extraction.

It has also been found that the highest yield and purity of high potency relaxin finished product is obtained when the ovaries are extracted in a two stage process as described above, that is, an initial digestion with aqueous acid followed by the addition of acetone to the resulting suspension. Where ovaries are extracted in a single stage with a mixed acid-acetone solvent system, the yield and purity of the finished product is reduced. For example, when ovaries were extracted with such a mixed solvent system, the tissue residue was found to contain 17.5 percent of the relaxin originally present in the ovaries, compared to the 2 to 5 percent observed with the two stage extraction method of the present invention. Also, when a single stage extraction is used, the extract contains a higher proportion of inactive nitrogen-containing impurities than does the extract obtained by the method of this invention. This results in a reduction in the potency of the finished product.

The conventional method for extracting relaxin from ovaries which has been used in the past is known as the acid-salt extraction method and is described in U.S. Patent No. 2,852,431 to Robert L. Kroc, et al., September 16, 1959. In brief, this method involves mixing finely ground ovaries with dilute acid, followed by the addition of a 4 percent salt solution. The extract is then separated from the tissue residue by filtration. This method affords a means for recovering relaxin from ovaries, but in common with single stage acid-acetone extraction, the tissue residue contains a significant proportion of the relaxin initially present in the ovaries.

The extraction method of this invention thus represents a substantial improvement over extraction techniques heretofore known in that the relaxin present in the ovaries is extracted with an activity yield in excess of 95 percent.

STEP II—SEPARATION OF RELAXIN FROM THE EXTRACT AS A COMPLEX WITH A PHOSPHORYLATED CARBOHYDRATE

The acid-acetone extract obtained in Step I as described above constitutes a very dilute solution of relaxin (about 3 to 12 G.P.U./ml.-volume of 250–300 gallons/ 500 pounds of ovaries extracted) in aqueous acid-acetone. The acetone volume concentration ranges from about 70 to about 85 percent.

Attempts to treat the extract with conventional protein precipitating agents, such as trichloroacetic acid, fail since it is found that relaxin is precipitated only from an acetone-free solution with such agents. To remove the acetone from the extract requires, for example, liquid-liquid extraction with a solvent such as ethylene chloride. Such extraction installations are large and require extensive facilities for the handling of large volumes of solvent and as a result this method is not practical.

Relaxin may be precipitated quantitatively from a solution by the addition of acetone to a volume concentration of 95 percent or higher. This requires the use of 3 to 6 volumes of acetone per volume of extract which would necessitate handling and recovering large volumes of acetone. Also, acetone is not selective as a relaxin precipitant with a result that a large proportion of the inactive nitrogen-containing impurities in the extract is precipitated together with the relaxin, thus markedly reducing the potency of the product.

It has now been found that the disadvantages are eliminated by diluting the acid-acetone extract with water and then adding a solution of a phosphorylated carbohydrate, thereby precipitating the relaxin from the extract as a phosphorylated carbohydrate-relaxin complex. The activity yield is essentially quantitative and in addition, the complex contains an appreciably smaller proportion of the inactive nitrogen-containing impurities than does the extract, thus indicating the selectivity of a phosphorylated carbohydrate as a relaxin precipitant.

The initial step in the isolation of relaxin from the acid-acetone extract is the dilution of the extract with sufficient water to reduce the acetone concentration to between about 30 and about 40 percent by volume. Dilution of the extract is required since phosphorylated carbohydrates are at least partially insoluble in solutions with a high acetone concentration. The dilution step has an added advantage in that acetone-soluble inactive impurities separate as a precipitate which may be removed by filtration.

The diluted, filtered extract is then mixed with a dilute acid solution of a phosphorylated carbohydrate. This solution will normally contain about 1 to about 5 percent by weight of the phosphorylated carbohydrate and have a pH on the acid side and preferably about 3. The quantity of phosphorylated carbohydrate added must be in excess of the amount required to form a complex with all the relaxin in the extract. At least 2 grams of phosphorylated carbohydrate per pound of ovaries extracted is normally required, with a quantity of about 4 grams per pound of ovaries extracted being preferred.

The method of this invention depends upon the discovery that relaxin forms an insoluble complex with a phosphorylated carbohydrate in a dilute acid medium. Various carbohydrates may be phosphorylated by methods well-known in the art for use in the invention, for example glucose, fructose, galactose, maltose, sucrose, raffinose and the like. The phosphorylated derivatives of non-reducing di- and tri-saccharides, for example sucrose and raffinose, are preferred as complex forming agents for use in the invention. Phosphorylated carbohydrates may be conveniently prepared by reacting a carbohydrate in pyridine solution with an excess of phosphorous oxychloride, followed by recovery of the phosphorylated carbohydrate from the reaction mixture.

The dilute solution of a phosphorylated carbohydrate prepared as described hereinabove, is added to the diluted and filtered acid-acetone extract, the mixture is stirred and the precipitated complex is allowed to settle. After precipitation of the relaxin as the complex, the complex is isolated by decantation and centrifugation and then is washed thoroughly with acetone.

The following examples are included in order further to illustrate the method of Step II:

*Example 2*

A quantity of 100 grams of sucrose is placed in a flask and heated under reflux with 110 grams of dry pyridine with constant agitation and the resulting solution is cooled to 0° C. 478 ml. phosphorus oxychloride is dissolved in 400 ml. dry pyridine, with the temperature being maintained at 0° C. and to the resulting solution is added the sucrose solution. During the addition, the temperature is maintained at 0° C. by external cooling. The temperature of the reaction mixture is allowed to come to room temperature over a period of several hours, and then the mixture is heated to 60° C., which temperature is maintained for two hours.

At the conclusion of the phosphorylation reaction, the mixture is cooled and 600 grams of ice in small pieces is added. The addition of ice is carried out slowly with external cooling so that the temperature does not exceed 60° C.

The resulting reaction mixture is poured into 2 liters of methanol with constant agitation, and the mixture is allowed to stand for two hours after which the insoluble residue is separated by filtration, and discarded. To the filtrate is added with constant agitation a solution of 900 ml. of 50 percent aqueous caustic soda solution in 2 liters of methanol. The solids are removed by filtration, washed with methanol, and dissolved in 2.08 liters of water. A quantity of 8.6 liters of methanol is then added slowly over a period of about one hour, the supernatant liquid is decanted and discarded, and the residue is dissolved in 1.5 liters of water. To the solution is added slowly over a period of about one hour, 6.5 liters of methanol. After decanting the supernatant liquid, the viscous residue is mixed with 2 liters of methanol and stirred for several hours. The solids are filtered, washed with methanol and dried under vacuum at 65° C. A quantity of 688 grams of phosphorylated sucrose is obtained.

*Example 3*

The acid-acetone extract prepared as described in Example 1, with a volume of 275 gallons, is diluted with 275 gallons of water and the resulting solution is clarified by filtration.

A quantity of 2000 grams of phosphorylated sucrose, prepared as described in Example 2, is dissolved in a mixture of 100 liters of water and 250 ml. of 12 N HCl. The resulting solution is added to the diluted, filtered extract, the mixture is stirred for 1 hour and then allowed to stand overnight at room temperature. The following day the clear supernatant liquid is decanted from the settled complex which is then isolated by filtration. The solids are suspended in 10 liters of acetone, thoroughly mixed in a colloid mill and the resulting fine suspension is filtered. The solids are washed with successive portions of acetone until a colorless filtrate is obtained.

A yield of 600 grams of a phosphorylated sucrose-relaxin complex with a potency of 16 G.P.U./mg. is obtained. This represents an activity yield of 19,200 G.P.U. per pound of ovaries extracted, which is a percentage activity yield of 95 percent for Steps I and II combined, or 98 percent for Step II.

The foregoing Example 3 illustrates the efficiency of the method of this invention in recovering the relaxin present in dilute solution in a tissue extract as a complex with a phosphorylated carbohydrate. Substantially all the relaxin activity present in the extract is recovered in the complex. It is a further feature of this method that a substantial proportion of the inactive nitrogen-containing impurities in the extract remains in solution during complex formation and these impurities are therefore not present in the recovered complex.

Two batches of ovaries were extracted by the method of Step I and the resulting extracts were processed by the method of Step II. The relaxin activity of the extract and phosphorylated sucrose-relaxin complex were determined by the guinea pig method; total nitrogen was determined by the Kjeldahl method. The results are shown in the following table:

TABLE 1

| Batch No. | Acid-acetone extract, G.P.U./mg. N | Complex, G.P.U./mg. N | Ratio: G.P.U./mg. N in complex to G.P.U./mg. N in extract |
| --- | --- | --- | --- |
| A | 44 | 327 | 7.4 |
| B | 63 | 314 | 5.0 |

The results presented in Table 1 establish that the recovery method of Step II results in between a 5 and 7.4 fold purification of relaxin with respect to inactive nitrogen-containing impurities.

The method of Step II is adaptable to the recovery of relaxin from extracts obtained by any of the known prior art methods such as the acid-salt extraction described in U.S. Patent No. 2,852,431. It is, however, particularly adaptable to the recovery of relaxin from extracts prepared by the method of Step I, since it represents the only effective and practical method of recovering relaxin from such extracts.

The phosphorylated carbohydrate-relaxin complex obtained by the method of Step II is further purified by the regeneration method to be described hereinafter as Step III.

STEP III—REGENERATION OF RELAXIN FROM THE PHOSPHORYLATED CARBOHYDRATE-RELAXIN COMPLEX

The product from Step II constitutes a complex of relaxin with a phosphorylated carbohydrate. It is essential that this complex be fully split into its individual components and the relaxin recovered in a form free from contamination by phosphorylated carbohydrate.

It has now been found that relaxin can be regenerated from the complex by the steps of suspending the complex in a liquid medium, either water or a mixture of water and acetone, treating the resulting mixture with concentrated hydrochloric acid and then adding a relaxin precipitating agent, either trichloroacetic acid where the liquid medium is water or acetone where the liquid medium is water or aqueous acetone.

The first step in the regeneration of the complex is to suspend the complex in a liquid medium, either water or an aqueous acetone solution containing up to 60 percent acetone. It has been found that water containing sufficient base, for example sodium hydroxide, to yield a complex solution at a pH of about 7 or 50 percent by volume aqueous acetone are preferred liquid media. Sufficient liquid medium is used to provide a mixture containing about 2 to about 15 percent by weight of the complex.

The resulting mixture is then treated with hydrochloric acid which serves to split the complex into its phosphorylated carbohydrate and relaxin moieties. To minimize volumes, acid of high normality should be used, preferably concentrated acid (12 N). It has been found that sufficient acid should be used so that the resulting mixture contains from about 6.5 to about 8.5 equivalents of hydrogen ion per liter of water present, with 7.5 equivalents per liter of water being particularly effective. The actual final normality will vary, depending upon the liquid medium used. When water alone is used, the final normality will, of course, be between about 6.5 and about 8.5. When, for example, a 50 percent by volume aqueous acetone solution is used, the final normality should be within the range of about 4.4 to about 6.7, with 5.5 being particularly effective.

Higher acid concentrations than those listed are undesirable since activity loss will occur. At lower acid normalities, a clear solution is not obtained and the relaxin precipitated therefrom is contaminated with unregenerated complex.

To minimize decomposition of relaxin with resulting loss in activity, it is desirable that the temperature be maintained at 0° C. or less during the acid treatment step.

Where water is used as a liquid medium, it is preferred that the mixture of complex and water be added to the concentrated hydrochloric acid. If the order of mixing is reversed, it has been observed that a fine colloidal suspension of complex is formed, which is soluble as the acidity is increased only after prolonged stirring. Where an aqueous acetone liquid medium is used, the order of mixing is not critical, although it is generally preferred that the concentrated hydrochloric acid be added to the suspension of complex in the aqueous acetone to avoid contacting the complex with strong acid. Due to the presence of acetone in the resulting mixture, the complex goes into solution rapidly.

The solution of complex, liquid medium and hydrochloric acid is then treated with a relaxin precipitating agent, either trichloroacetic acid when the liquid medium is water or acetone when the liquid medium is water or aqueous acetone. This serves to precipitate the relaxin from the solution in a form in which it can readily be separated from the liquid phase. When trichloroacetic acid is used, it is added in an amount of between about 5 and about 15 percent by weight of the relaxin-phosphorylated carbohydrate-acid solution, with an amount of 10 percent by weight of the solution being preferred. When acetone is used as precipitating agent, it is added in an amount sufficient to insure an acetone volume concentration of at least 90 percent in the liquid phase. It has been observed that the free acid form of the phosphorylated carbohydrate is soluble in solutions of such a high acetone concentration whereas the relaxin precipitates from the solution.

The liquid phase is then separated from the relaxin precipitate by decantation, the solids are suspended in acetone, filtered or centrifuged, washed repeatedly with acetone and dried.

It has been found that a regeneration sequence of steps comprising suspending the complex in 50 percent aqueous acetone, adding concentrated hydrochloric acid, and precipitating the relaxin by raising the acetone concentration to 90 percent by volume is particularly effective. By this technique, relaxin is not contacted with a highly concentrated acid medium and the use of acetone as a precipitating agent results in a rapidly settling, free flowing relaxin precipitate, even in large scale operations.

The following examples are included further to illustrate the method of Step III:

Example 4

A portion of the phosphorylated sucrose-relaxin complex obtained in Example 3 weighing 18.7 grams, activity=16 G.P.U./mg. is homogenized with 400 ml. water in a colloid mill. The pH of the mixture is adjusted to 7 by the addition of 1 N NaOH, whereupon the complex goes into solution. The volume of the solution is adjusted to 561 ml. by the addition of water and the solution is then cooled to 0° C.

935 ml. of 12 N HCl is cooled to a temperature between −20° C. and −15° C., and placed in a glass lined vessel. The cooled solution of phosphorylated sucrose-relaxin complex is added to the cooled HCl with vigorous agitation and external cooling to maintain the temperature at below −5° C. Immediately thereafter 150 grams of tri-chloroacetic acid is added while the mixture is vigorously agitated and the temperature is maintained at −20° C. with external cooling. The resulting mixture is then allowed to stand to permit the precipitate to settle.

As much as possible of the clear or slightly opaque solution is decanted and the residue is suspended in 1300 ml. of acetone at a temperature of −15° C. The mixture is stirred briefly to permit uniform dispersion of the precipitate and then is allowed to stand to permit the precipitate to settle. The clear liquid is decanted and the residue is suspended again in acetone and the foregoing procedure is repeated twice more. The final residue is filtered and washed with cold acetone repeatedly until the filtrate is substantially colorless. The solids are dried in a vacuum until substantially free from the odor of acetone. The material, which is denoted as regenerated crude relaxin, weighs 8.9 grams and has a potency of 32 G.P.U./mg. This represents an activity yield of 18,300 G.P.U. per pound of ovaries extracted or a percentage activity yield of 95 percent in Step III. The overall percentage activity yield for Steps I, II and III as illustrated by Examples 1, 3 and 4 is 90 percent.

Example 5

A quantity of 20 grams of a phosphorylated sucrose-relaxin complex, activity=15 G.P.U./mg., is suspended in 200 ml. 50 percent by volume aqueous acetone at a temperature of −10° C. 167 ml. 12 N HCl, precooled to −20° C., are then added. Then a quantity of 2600 ml. acetone at −20° C. is added, the mixture is stirred for 20 minutes and allowed to settle for 1 hour. The liquid phase is decanted and the solids are suspended in 2000 ml. acetone. The mixture is allowed to settle, the liquid phase is removed by decantation, the solids are repeatedly washed with acetone and dried to yield 12 grams regenerated crude relaxin with a potency of 24 G.P.U./mg. This represents a percentage activity yield in Step III of 92 percent.

The method of Step III as described hereinabove is the only satisfactory method which has been found for obtaining a rapid, clear separation of relaxin from a phosphorylated carbohydrate-relaxin complex. Attempts to use other dissociating agents in conjunction with separation by extraction and absorption on ion exchange resins have proved unsatisfactory.

The regenerated crude relaxin obtained as the product of Step III may be further purified to yield a high potency relaxin finished product by any of the relaxin purification methods of the prior art, such as those described in U.S. Patent 2,852,431. It is preferred, however, for the highest yields and potency of the finished product, that the purification techniques described hereinafter in Steps IV, V and VI be utilized.

STEP IV—PARTIAL PURIFICATION OF REGENERATED CRUDE RELAXIN BY ACID-ACETONE FRACTIONATION

It has now been found that an impure relaxin fraction, such as the regenerated crude relaxin obtained in Step III, can be purified by extraction with an aqueous mineral acid-acetone solvent system. With proper control of the acetone concentration and acid normality, a fraction comprising inactive impurities relatively free from relaxin is precipitated from the solution, with substantially all of the relaxin remaining in solution at a significantly higher potency than that of the input material.

This purification method is based upon the discovery that as the acetone concentration of a relaxin solution in an aqueous mineral acid-acetone solution is increased, progressively larger amounts of the inactive impurities precipitate from the solution. Hydrochloric acid is the preferred mineral acid and its normality in the final mixture should be between about 0.07 and about 0.7 N. With an acetone volume concentration in the final solution of between 77 and 82 percent by volume, significant purification is obtained without appreciable loss of relaxin activity in the precipitate.

The temperature of the solution during the extraction should be maintained below 0° C. to avoid activity losses.

After removal of the inactive precipitate, the acetone concentration of the solution is increased to at least 90 percent by volume and the purified relaxin precipitate is recovered by filtration, washed and dried.

The following examples are included in order further to illustrate the acid-acetone purification method of Step IV.

Example 6

A quantity of regenerated crude relaxin obtained by the procedure of Step III weighing 10 grams and having a potency of 23 G.P.U./mg. is dispersed in 100 ml. water and to the dispersion is added 200 ml. of acetone precooled to −10° C. To this suspension is added 4.3 ml. 12 N HCl and 213 ml. acetone, both precooled to −10° C. The resulting mixture (0.1 N in HCl, 80% volume concentration of acetone) is centrifuged and the precipitate is repulped with 50 ml. of a mixture of 1 volume water, 0.43 volume 12 N HCl and 4.13 volumes acetone at −10° C. This suspension is centrifuged and the two liquid phases are combined. Acetone is added in an amount sufficient to raise the acetone volume concentration to 95 percent (about 1700 ml.). The resulting precipitate is separated from the liquid phase, washed repeatedly with acetone and dried in a vacuum to yield 3.8 grams of partially purified relaxin, potency=66 G.P.U./mg. The essentially inactive fraction recovered during the fractionation weighs 5 grams and has a potency of 2 G.P.U./mg. The activity yield in Step IV is 95 percent.

The criticality of the acetone concentration in the acid-acetone fractionation is illustrated by the following tabulation, showing the results of Example 6 where the acetone volume concentration is 80 percent and the results of two other experiments by the same general procedure, except at acetone concentrations of 75 percent and 85 percent by volume, respectively.

TABLE 2—EFFECT OF ACETONE CONCENTRATION ON ACID-ACETONE FRACTIONATION (ACID NORMALITY=0.1)
[Input=10 grams, potency 23 G.P.U./mg.]

| Acetone Conc. (percent by vol.) | Inactive fraction | | Active fraction | | Activity[1] yield (percent) |
|---|---|---|---|---|---|
| | Weight (gms.) | Potency (G.P.U./mg.) | Weight (gms.) | Potency (G.P.U./mg.) | |
| 66 | 0.3 | ---- | 9.8 | 20 | 99 |
| 75 | 3.16 | 2 | 7.25 | 34 | 97 |
| 80 | 5.55 | 2 | 3.8 | 66 | 95 |
| 85 | 9.45 | 13 | 0.92 | 92 | 41 |

[1] Computed by dividing the total activity in the active fraction by the sum of the activities in the inactive and active fractions and multiplying the quotient by 100.

It can be seen from the results in Table 2 that the activity yield falls-off extremely rapidly as the acetone concentration approaches 85 percent. Thus, such a high acetone concentration is not economically feasible even though a high degree of purification is obtained. As the acetone concentration is reduced toward 75 percent, the degree of purification is reduced. Consequently, a range of 77 to 82 percent acetone is preferred with 80 percent being particularly effective, since good purification (23 G.P.U./mg. to 66 G.P.U./mg.) is obtained with virtually quantitative activity yield (95%).

Although the acid-acetone fractionation of Step IV is particularly adapted to the purification of relatively impure relaxin fractions, such as regenerated crude relaxin obtained in Step III, it is also useful in purifying more highly purified relaxin fractions, as is illustrated in the following example:

*Example 7*

A quantity of 500 mg. of a relaxin preparation having an activity of 200 G.P.U./mg. is contacted with 5 ml. of a solution of 0.6 N HCl in aqueous acetone, the acetone volume concentration being 80 percent. The resulting mixture is stirred vigorously and centrifuged. This procedure is repeated 4 more times to yield a final residue weighing 80 mg. with an activity of 6 G.P.U./mg. The filtrates are combined and added to 75 ml. acetone. The precipitate after being washed with acetone and dried in vacuum weighs 300 mg. and has a potency of 330 G.P.U./mg. The activity yield in the fractionation is 99 percent and the material is purified from 200 G.P.U./mg. to 330 G.P.U./mg.

The partially purified relaxin obtained in Step IV has a sufficiently high purity for certain therapeutic uses. Thus, it is comparable in potency to the "relaxin stock powder" described in U.S. Patent 2,852,431. In most cases, however, further purification is desirable. This may be effected by known prior art techniques, such as the procedures described in U.S. Patent 2,852,431, but preferably further purification is by the methods to be described in Steps V and VI.

STEP V—PURIFICATION OF PARTIALLY PURIFIED RELAXIN BY ZINC COMPLEX FRACTIONATION

It has now been found that a relaxin fraction, such as the partially purified relaxin obtained as the product of Step IV, may be purified by dissolving it in a mixed acetone-water solution of a zinc salt thereby forming a relaxin-zinc complex, cooling the resulting solution, separating the precipitate which forms during the cooling step and regenerating a purified relaxin from the complex dissolved in the mother liquor. The purification of impure relaxin by such zinc complex fractionation is adaptable to the purification of any relaxin preparation ranging from a low to a high potency, and has been found particularly useful in the purification of partially purified relaxin obtained in Step IV in conjunction with other known relaxin purification methods.

Purification of relaxin through zinc complex fractionation in accordance with this invention is based on the discovery that as one cools a warm solution of relaxin in water containing 50 to 70 percent acetone by volume and a soluble zinc salt at a concentration of about 0.4 to 1 molar, the mother liquor remaining after removal of the successive precipitates which form contains relaxin of progressively increasing potency. By incremental cooling of such a solution with removal of the successive precipitates, it is possible to fractionate a relaxin preparation to yield fractions of varying potency.

Zinc chloride is the preferred zinc salt for use in the purification method, although it is to be understood that any aqueous acetone-soluble zinc salt is equally useful in the method of this invention. It has also been found that a solution comprising about 60 percent by volume of acetone in water and having a concentration of zinc chloride of about 0.6 M is particularly effective as a solvent in the zinc complex fractionation of relaxin in accordance with the invention. The pH of the solution is of critical importance to insure satisfactory complex formation with zinc and to obtain a useful degree of purification. The pH should normally be maintained within the range of about 4.5 to about 7 with a pH of about 5.6 being generally preferred. If the solution is too acidic, it is observed that no precipitate forms when the solution is cooled with the result that no purification is obtained. If the pH rises above pH 7 a suspension of zinc hydroxide is formed which results in the removal of zinc ions from the solution without significant purification.

The fractionating solution of relaxin may be prepared in several ways. For example, the relaxin to be purified is dissolved in water and the pH adjusted to the proper value. Then a solution of a zinc salt, such as zinc chloride, in acetone is added in an amount and concentration sufficient to yield a solution having the proper zinc and acetone concentrations. Alternately, a solution of water, zinc salt and acetone in the proper proportions is prepared, the relaxin added, the pH adjusted to the proper value and the mixture warmed until a clear solution is obtained. The fractionating solution normally contains about 1 to about 5 percent by weight of the relaxin fraction to be treated.

It has been found that when such a solution of relaxin is cooled to a temperature between about 30° C. and 5° C., the precipitate which forms is essentially devoid of relaxin activity. Thus the initial step in the purification of relaxin by zinc complex fractionation is to stir a fractionating solution prepared as described hereinabove at a temperature within the above range and preferably at about 25° C. until equilibrium is attained and then separate the precipitate from the mother liquor. It has also been found that significant purification without excessive activity loss is obtained by cooling this mother liquor to a temperature at least as low as −15° C. and preferably between about −15° C. and −30° C. The precipitate has lower activity than that of the input material and the mother liquor can be further processed to regenerate therefrom a relaxin fraction having a significantly higher activity than that of the input material.

In the purification of a relaxin fraction such as that obtained from Step IV, the cooling from +25° C. to between −15° C. and −30° C. may be carried out in a single step. Alternately, a stepwise cooling process may be carried out to fractionate the input material into a series of fractions of varying potency.

Each fraction formed constitutes a zinc complex of relaxin and impurities and may be regenerated by treatment with a mineral acid, preferably hydrochloric acid, at a normality of at least 2 N at a temperature of less than 10° C. The final mother liquor after cooling of the fractionating solution to between −15° C. and −30° C. must first be treated with acetone to precipitate the complex therefrom. Then, each complex fraction is regenerated by treatment with acid as described above. Any precipitate which forms during the regeneration step is removed and a zinc-free relaxin fraction is then precipitated from the solution by treating with trichloroacetic acid.

The following examples illustrate the zinc complex fractionation method of this invention as applied to relaxin fraction of both low and high potency:

Example 8

A quantity of 1.0 gram of relaxin having a potency of 130 G.P.U./mg. is stirred for one hour at 25° C. with 20 ml. of 0.6 M $ZnCl_2$ in a 60 percent acetone solution in water. The precipitate is separated by centrifugation and the mother liquor stirred for 16 hours at a temperature of 4° C. The precipitate is separated and the mother liquor stirred for 16 hours at a temperature of —23° C. After removal of the precipitate, the mother liquor is poured into 10 volumes of acetone, 1 M $ZnCl_2$ solution in acetone is added, the precipitate is washed with acetone and finally dried in vacuum at room temperature.

The precipitates obtained at 25° C., 4° C. and —23° C. are each dissolved in dilute HCl and the purified fractions precipitated by the addition of excess acetone and $ZnCl_2$ as described above in connection with the purification of the final mother liquor.

The results of the fractionation are shown in the following table:

TABLE 3

| | Potency (G.P.U./mg.) | Percent of input | |
|---|---|---|---|
| | | Weight | Activity |
| Input | 130 | 100 | 100 |
| +25° C. precipitate | | 11 | |
| +4° C. precipitate | | 28 | |
| —23° C. precipitate | 70 | 32 | 16 |
| Precipitate from —23° C. mother liquor | 375 | 29 | 84 |
| | | 100 | 100 |

Example 9

A quantity of 2.7 grams of relaxin having a potency of 30 G.P.U./mg. is dissolved in 100 ml. of 0.6 M $ZnCl_2$ in a 60 percent acetone solution in water at 25° C. The precipitate is removed and the mother liquor cooled to —3° C. and then to —23° C., with the precipitates which form being removed. The final mother liquor and the three precipitates are treated as described in Example 8.

The results of the fractionation are shown in the following table:

TABLE 4

| | Weight (mg.) | Potency (G.P.U./mg,) | Percent of input | |
|---|---|---|---|---|
| | | | Weight | Activity |
| Input | 2,700 | 30 | 100 | 100 |
| +25° C. precipitate | 310 | 2 | 12 | 1 |
| —3° C. precipitate | 599 | 5 | 22 | 4 |
| —23° C. precipitate | 1,030 | 14 | 38 | 17 |
| Precipitate from —23° C. mother liquor | 1,031 | 60 | 38 | 76 |
| | 2,970 | | 110 | 98 |

The results shown in Tables 3 and 4 illustrate the efficiency of zinc complex fractionation in purifying relaxin fractions having a potency of 130 and 30 G.P.U./mg., respectively. Although the precipitates were recovered as relaxin-zinc complexes and assayed in this form, they may each be regenerated by treatment with mineral acid as described hereinabove to obtain zinc-free products.

The following Example 10 illustrates the purification of a fraction designated partially purified relaxin obtained from Step IV in the integrated extraction and purification method of this invention by a sequence of steps comprising zinc complex fractionation:

Example 10

A partially purified relaxin fraction weighing 3.1 grams and having a potency of 87 G.P.U./mg., obtained by the methods of Steps I–IV, is dissolved in 41 ml. water and the pH is adjusted to 5.6 by the addition of 2 N NaOH. 62.6 ml. of 1 M zinc chloride solution in acetone is added and the mixture is stirred in a closed vessel for 30 minutes at 25° C. The solids are separated by centrifugation and repulped twice with 16 ml. of 0.6 M zinc chloride in 60 percent acetone solution. The solids weighing 1.12 grams and having a potency of 5 G.P.U./mg. are removed by centrifugation and discarded. The liquids obtained from all centrifuging steps are combined.

The solution is cooled to about —20° C. and stirred overnight in a closed vessel at this temperature. The precipitate which forms is removed by centrifugation. This precipitate weighs 1.69 grams and has a potency of 42 G.P.U./mg.; it is designated as primary crude fraction A. After the removal of fraction A, the liquid having a volume of 160 ml. is added to 1600 ml. of acetone, the precipitate weighing 906 mg. is separated by filtration and dissolved in 18 ml. 0.1 N HCl at a temperature of 0° C. To this mixture is added 11.7 ml. 5 N HCl, pre-cooled to —10° C. and the resulting mixture is stirred for 15 minutes with the temperature maintained between 0 and 5° C. The small precipitate which forms is removed by filtration.

To the filtrate is added 31 ml. of a 20 percent aqueous solution of trichloroacetic acid at a temperature of 5° C. The solids are separated and repulped with 15.5 ml. of a 75 percent aqueous acetone solution containing 2.5 percent trichloroacetic acid. The precipitate is removed and discarded and the filtrate is added to 150 ml. of acetone. The mixture is allowed to settle and the clear supernatant liquid is removed by decantation and centrifugation. The solids obtained weigh 571 mg. and are dissolved in 11.5 ml. water, the pH is adjusted to 7 by the addition of dilute aqueous ammonia, and the mixture is heated to 65° C. over a period of about 30 minutes. The mixture is then cooled to 30° C. over about one hour and filtered. The precipitate which forms weighing 44 mg. is designated as primary crude fraction B. This material has a potency of about 69 G.P.U./mg.

The pH of the filtrate which has a volume of 23.5 ml. is adjusted to 5.5 with 1 N HCl and is added to 235 ml. acetone. The solids are removed by filtration, repulped three times with excess acetone and finally dried in vacuum over calcium chloride to constant weight. A yield of 514 mg. of high potency relaxin finished product is obtained, which has a potency of 196 G.P.U./mg.

The foregoing Example 10 illustrates the purification of a partially purified relaxin fraction from Step IV by a sequence of steps including zinc complex fractionation. In Example 10, the product obtained after zinc complex fractionation is further purified by procedure D described in U.S. Patent 2,852,431.

The results of the purification are presented in Table 5:

TABLE 5

| | Weight (gms.) | Potency (G.P.U./mg.) | Total activity (G.P.U.) |
|---|---|---|---|
| Input: | | | |
| Partially purified relaxin | 3.1 | 87 | 269,700 |
| Output: | | | |
| +25° C. precipitate | 1.12 | 5 | 5,600 |
| —20° C. precipitate: | | | |
| Fraction A | 1.69 | 42 | 71,000 |
| Fraction B | 0.044 | 69 | 3,000 |
| Relaxin finished product | .513 | 196 | 100,700 |
| | | | 180,300 |

The activity yield by the procedure described in Example 10 is 38 percent based on the relaxin finished product. An additional 28 percent of the input activity is represented by primary crude fractions A and B. A substantial portion of the activity represented in these fractions is recoverable by the method of Step VI to be described hereinafter to augment the yield of relaxin finished product. It will be understood that the inclusion of procedure D of U.S. Patent 2,852,431 in the purification described in Example 10 is merely exemplary. Zinc complex fractionation may be used by itself, as evidenced by Examples 8 and 9, or may be used in combination with any one or more of the procedures described in U.S. Patent 2,852,431.

The finished product may be formulated into any of the well-known dosage forms which have been used in relaxin therapy. For example, the relaxin may be dissolved in distilled water at pH 7, any precipitate which forms removed by centrifugation and the supernatant filtered through sintered glass and finally through a filter of a porosity of 1.2 microns or less. If this procedure is carried out using sterile techniques, a stable sterile solution of relaxin is obtained, suitable for injection.

STEP VI—PURIFICATION OF RELAXIN BY FRACTIONAL FORMATION OF A PHOSPHORYLATED CARBOHYDRATE-RELAXIN COMPLEX

It has now been found that an impure relaxin fraction, such as the primary crude fractions obtained during the zinc complex fractionation described hereinabove as Step V, may be purified by fractional formation of a phosphorylated carbohydrate-relaxin complex. This method is based upon the discovery that as a phosphorylated carbohydrate is added to an aqueous solution of impure relaxin, the initial precipitate which forms constitutes a complex which, upon regeneration, yields relaxin of higher potency than that of the input material. Subsequent precipitates constitute relaxin of progressively decreasing potency. This method is adaptable to the purification of any impure relaxin fraction and may be used in conjunction with other purification techniques, such as acid-acetone fractionation as described hereinabove in Step IV or the various procedures described in U.S. Patent 2,852,431. By application of this method to the primary crude fractions obtained in Step V, the overall yield of high potency relaxin finished product obtained from ovaries is further enhanced.

In accordance with the method of Step VI, the impure relaxin fraction to be purified is dissolved in water and the pH is adjusted to the acid side of neutral, preferably to about pH 3. The resulting solution normally contains about 0.5 to about 5 percent by weight of the relaxin fraction to be purified. A dilute aqueous solution of a phosphorylated carbohydrate (about 1 to about 5 percent by weight) is then prepared at a pH on the acid side, preferably about pH 3. Any of the phosphorylated carbohydrates described hereinabove in connection with the method of Step II may be used, with phosphorylated raffinose and phosphorylated sucrose being particularly effective. The phosphorylated carbohydrate solution is then added to the solution of impure relaxin. Where it is desired to fractionate the impure relaxin into a number of fractions of varying potency, the phosphorylated carbohydrate solution is added in small portions, with each precipitate being removed before the addition of each succeeding portion. Alternately, where only a single fraction of significantly higher potency than the input material is desired, it has been found that the addition of about 25 to about 40 percent of the amount of phosphorylated carbohydrate found necessary for total precipitation is desirable. The amount required for total precipitation may conveniently be determined by testing a small aliquot of the relaxin solution to be purified.

The precipitate or precipitates which form constitute complexes of the phosphorylated carbohydrate with relaxin which may be regenerated by the method of Step III hereinabove. In the purification of the primary crudes obtained in Step V by the method of Step VI, the phosphorylated carbohydrate-relaxin complex obtained may be regenerated separately to obtain a relaxin fraction having a potency sufficient for therapeutic use. The fraction so obtained may be combined with the high potency relaxing finished product obtained in Step V to augment the overall yield of finished product. Alternately, the phosphorylated carbohydrate-relaxin complex obtained may be combined with the main product stream complex from Step II and thereafter regenerated and purified in a single stream by the methods of Steps III, IV and V to obtain a high potency relaxin finished product.

The following Example 11 is included in order to illustrate the purification of the primary crudes obtained in Step V by a sequence of steps comprising fractional formation of a phosphorylated carbohydrate-relaxin complex:

Example 11

In an extraction of relaxin from ovaries in accordance with the method of this invention, a quantity of 3.6 grams of primary crude fractions A and B, with a potency of 50 G.P.U./mg., is obtained in Step V. This material is first subjected to acid-acetone fractionation by the procedure of Step IV as described in Example 6 to yield an inactive fraction weighing 0.87 gram, potency of 6 G.P.U./mg., and an active fraction weighing 2.4 grams, potency of 70 G.P.U./mg.

This active fraction is dissolved in 250 ml. water, and the pH is adjusted to 3. To this solution is added 72 ml. of a 1 percent by weight solution of phosphorylated sucrose in water at pH 3. This represents approximately 30 percent of the amount of phosphorylated sucrose required for total precipitation of the nitrogen-containing materials present in the aqueous relaxin solution. The precipitate which forms (weight: 2.06 grams) is recovered by centrifugation and washed with acetone. To the mother liquor is added 44 ml. of the 1 percent phosphorylated sucrose solution, as a result of which a second precipitate weighing 0.56 gram is obtained.

The two precipitates in the form of phosphorylated sucrose-relaxin complexes are regenerated separately by the procedure of Step III. The first precipitate yields 1.67 grams of relaxin having a potency of 123 G.P.U./mg.; the second yields 0.42 gram of relaxin with a potency of 10 G.P.U./mg.

The fraction weighing 1.67 grams is dissolved in 0.85 percent sodium chloride solution, and the pH is adjusted to 7 by the addition of ammonia. The precipitate which forms is separated and discarded, and the mother liquor is added to sufficient acetone to raise the acetone concentration to 95 percent by volume. The final precipitate which forms is separated by filtration, washed with acetone and dried to obtain 0.94 gram having a potency of 147 G.P.U./mg.

Example 11 illustrates the purification of the primary crudes obtained in Step V by a sequence of steps comprising acid-acetone fractionation as described hereinabove in Step IV, fractional formation of a phosphorylated carbohydrate-relaxin complex, and precipitation of impurities at pH 7 which is procedure A of U.S. Patent 2,852,431.

The following table summarizes the results of Example 11:

TABLE 6

| Fraction | Weight (gms.) | Potency (G.P.U./mg.) | Total activity (G.P.U.) | Activity yield (based on input) |
|---|---|---|---|---|
| Input: | | | | |
| Primary crudes | 3.6 | 50 | 180,000 | 100 |
| Output: | | | | |
| Finished product | 0.94 | 147 | 138,200 | 76.8 |
| Inactive fraction from acid-acetone fractionation | 0.87 | 6 | 5,200 | |
| Inactive fraction from Phosp. Carbo.-Relaxin Fractionation | 0.42 | 10 | 4,200 | |

The table indicates that the primary crudes may be purified at a high yield to a product with a potency of 147 G.P.U./mg. Also, Example 11 indicates that the phosphorylated carbohydrate-relaxin complex fractional formation step results by itself in a purification of from 70 to 123 G.P.U./mg. It is to be understood that the active phosphorylated carbohydrate-relaxin complex may be combined with the product of Step II and carried through Steps III, IV and V as a single product stream. In addition, the method of fractional formation of a phosphorylated carbohydrate-relaxin complex described hereinabove may be combined with other methods of purification than those described in Example 11.

The following Example 12 is included in order further to illustrate the application of fractional formation of a phosphorylated carbohydrate-relaxin complex to the purification of relaxin:

*Example 12*

A quantity of 1 gm. of relaxin having a potency of 200 G.P.U./mg. is dissolved in 25 ml. water and the pH is adjusted to 4.5. An aqueous solution of 1 percent by weight of phosphorylated raffinose at pH 4.5 is then prepared. A quantity of 0.3 ml. of the phosphorylated raffinose solution is added to the relaxin solution, this quantity being 1.2 percent of the amount of phosphorylated raffinose required for total precipitation of the relaxin from the relaxin solution as determined on a small aliquot. The precipitate which forms is separated by filtration, washed with a 1 percent aqueous solution of phosphorylated raffinose and dried. Assay of this material shows a potency of 800 G.P.U./mg. representing a 4-fold purification compared to the original material.

Example 12 illustrates the very high degree of purification which may be obtained by the method of Step VI when only a small percentage of the quantity of phosphorylated carbohydrate required for total precipitation is added.

SUMMARY

The method of the present invention represents a highly advantageous means of recovery of a substantial proportion of the relaxin content of animal ovaries as a high potency relaxin finished product. The results of the extraction and recovery as exemplified by the foregoing examples are tabulated in Table 7:

TABLE 7.—SUMMARY OF RECOVERY OF RELAXIN FROM OVARIES

| Step No. | Example | Product identification | Activity yield | |
|---|---|---|---|---|
| | | | Step yield (percent) | Overall yield (percent) |
| I | 1 | Acid-acetone extract | 97 | 97 |
| II | 3 | Phosphorylated carbohydrate-relaxin complex | 98 | 95 |
| III | 4 | Regenerated crude Relaxin | 95 | 90.3 |
| IV | 6 | Partially purified Relaxin | 95 | 85.8 |
| V | 10 | High potency Relaxin primary crudes | 38 | 32.6 |
| | | | 28 | 24 |
| VI | 11 | High potency Relaxin from primary crudes | 76.8 | 18.4 |

NOTE.—Overall yield of high potency Relaxin=51%.

It is seen that 51 percent of the total relaxin activity in the ovaries is recovered as finished product. This represents an appreciable improvement over presently known extraction techniques.

It is understood that the foregoing detailed description is given merely by way of illustration and that many variations may be made therein without departing from the spirit of my invention.

Having described my invention, what I desire to secure by Letters Patent is:

1. A method of recovering relaxin from a dilute acid solution thereof which comprises adding to said solution an excess of a phosphorylated carbohydrate and separating therefrom the resulting precipitate constituting a phosphorylated carbohydrate-relaxin complex.

2. A method according to claim 1 wherein said phosphorylated carbohydrate is a phosphorylated derivative of a member selected from the group consisting of non-reducing di-saccharides and non-reducing tri-saccharides.

3. A method according to claim 1 wherein said phosphorylated carbohydrate is phosphorylated sucrose.

4. A method according to claim 1 wherein said phosphorylated carbohydrate is phosphorylated raffinose.

5. A method of recovering relaxin from animal ovaries which comprises extracting the ovaries with a dilute aqueous mineral acid, adding sufficient acetone to provide an acetone concentration of between about 70 and about 85 percent by volume, separating the tissue residue from the mixture to yield an acid-acetone extract comprising relaxin dissolved therein, adding water to said extract in an amount sufficient to reduce the acetone concentration to about 30 to about 40 percent by volume, adding an excess of a phosphorylated carbohydrate to the diluted extract and separating therefrom the precipitate constituting a phosphorylated carbohydrate-relaxin complex.

6. A method according to claim 5 wherein said phosphorylated carbohydrate is added to the diluted extract in the form of a dilute aqueous solution containing about 1 to about 5 percent by weight of said phosphorylated carbohydrate.

7. A method according to claim 6 wherein said dilute aqueous acid solution has a pH of about 3.

8. A method according to claim 6 wherein said phosphorylated carbohydrate is phosphorylated sucrose.

9. A method according to claim 6 wherein said phosphorylated carbohydrate is phosphorylated raffinose.

10. A method according to claim 6 wherein at least 2 grams of said phosphorylated carbohydrate per pound of ovaries extracted is added to the diluted extract.

11. A method according to claim 10 wherein about 4 grams of said phosphorylated carbohydrate per pound of ovaries extracted are added to the diluted extract.

12. A method of regenerating relaxin from a phosphorylated carbohydrate-relaxin complex which comprises suspending said complex in a liquid medium selected from the group consisting of water and mixtures of water and acetone containing up to 60 percent acetone by volume, treating said suspension with concentrated hydrochloric acid and adding to the resulting mixture a precipitating agent selected from the group consisting of trichloroacetic acid when said liquid medium is water and acetone when said liquid medium is selected from the group consisting of water and mixtures of water and acetone containing up to 60 percent acetone by volume.

13. A method according to claim 12 wherein the amount of said hydrochloric acid added to said suspension is sufficient that the resulting mixture contains about 6.5 to about 8.5 equivalents of hydrogen ion per liter of water present in said mixture.

14. A method according to claim 13 wherein the amount of said hydrochloric acid added to said suspension is sufficient that the resulting mixture contains 7.5 equivalents of hydrogen ion per liter of water present in said mixture.

15. A method of regenerating relaxin from a phosphorylated carbohydrate-relaxin complex which comprises suspending said complex in water at a pH of about 7, adding said suspension to concentrated hydrochloric acid in an amount sufficient that the normality of the resulting mixture is between about 6.5 and about 8.5, the temperature of the mixture being maintained at less than 0° C. during said addition, adding to said mixture a precipitating agent selected from the group consisting of trichloroacetic acid and acetone, and separating the precipitate which forms comprising relaxin.

16. A method according to claim 15 wherein said precipitating agent is trichloroacetic acid which is added in an amount of about 5 to about 15 percent of the weight of said mixture.

17. A method according to claim 15 where said precipitating agent is acetone which is added in an amount sufficient to provide an acetone volume concentration of at least 90 percent.

18. A method of regenerating relaxin from a phosphorylated carbohydrate-relaxin complex which comprises suspending said complex in water at a pH of about 7, said suspension containing about 2 to about 15 percent by weight of said complex, adding said suspension to concentrated hydrochloric acid while maintaining the temperature at less than 0° C., the amount of said acid being such that the normality of the mixture after said addition is about 7.5, adding to said mixture trichloroacetic acid in an amount of about 10 percent by weight of said mixture while maintaining the temperature at less than 0° C. and separating the precipitate which forms comprising relaxin.

19. A method according to claim 18 wherein said phosphorylated carbohydrate-relaxin complex is a phosphorylated sucrose-relaxin complex.

20. A method according to claim 18 wherein said phosphorylated carbohydrate-relaxin complex is a phosphorylated raffinose-relaxin complex.

21. A method of regenerating relaxin from a phosphorylated carbohydrate-relaxin complex which comprises suspending said complex in aqueous acetone comprising up to 60 percent acetone by volume, adding concentrated hydrochloric acid to said suspension in an amount such that the normality after said addition is between about 4.4 and 6.7, the temperature of the mixture during said addition being maintained at less than 0° C., adding acetone to the resulting mixture and separating the precipitate which forms comprising relaxin.

22. A method according to claim 21 wherein said aqueous acetone comprises about 50 percent acetone by volume.

23. A method according to claim 21 wherein said acetone is added in an amount sufficient to provide an acetone volume concentration of at least 90 percent.

24. A method according to claim 23 wherein the temperature of the mixture is maintained at less than 0° C. during the addition of said acetone.

25. A method of regenerating relaxin from a phosphorylated carbohydrate-relaxin complex which comprises suspending said complex in aqueous acetone comprising about 50 percent acetone by volume, said suspension containing about 2 to about 15 percent by weight of said complex, adding concentrated hydrochloric acid to said suspension in an amount such that the normality of the mixture after said addition is about 5.5, the temperature during said addition being maintained at less than 0° C., adding to said mixture sufficient acetone to raise the acetone volume concentration to at least 90 percent and separating the precipitate which forms comprising relaxin.

26. A method according to claim 25 wherein said phosphorylated carbohydrate-relaxin complex is a phosphorylated sucrose-relaxin complex.

27. A method according to claim 25 wherein said phosphorylated carbohydrate-relaxin complex is a phosphorylated raffinose-relaxin complex.

28. A method of recovering relaxin from animal ovaries which comprises extracting the ovaries with a dilute aqueous mineral acid, adding sufficient acetone to provide an acetone concentration of between about 70 and about 85 percent by volume, separating the tissue residue from the mixture to yield an acid-acetone extract comprising relaxin dissolved therein, adding water to said extract in an amount sufficient to reduce the acetone concentration to about 30 to about 40 percent by volume, adding an excess of a phosphorylated carbohydrate to the diluted extract, separating therefrom the precipitate constituting a phosphorylated carbohydrate-relaxin complex, suspending said complex in a liquid medium selected from the group consisting of water and mixtures of water and acetone containing up to 60 percent acetone by volume, treating said suspension with concentrated hydrochloric acid and adding to the resulting mixture a precipitating agent selected from the group consisting of trichloroacetic acid when said liquid medium is water and acetone when said liquid medium is selected from the group consisting of water and mixtures of water and acetone containing up to 60 percent acetone by volume.

29. A method of purifying an impure relaxin fraction which comprises mixing said fraction at a temperature of less than 0° C. with a mixture of an aqueous mineral acid and acetone, the acid normality of said mixture being about 0.07 to about 0.7 and the acetone volume concentration being between 77 percent and 82 percent, separating the precipitate which forms and increasing the acetone concentration of the liquid phase to at least 90 percent by volume to precipitate purified relaxin therefrom.

30. A method according to claim 29 wherein said mineral acid is hydrochloric acid.

31. A method according to claim 30 wherein the normality of said hydrochloric acid is about 0.1 N and the acetone volume concentration in said mixture is about 80 percent.

32. A method of purifying an impure relaxin fraction which comprises mixing said fraction at a temperature between about 30° C. and about 5° C. with a solution in aqueous acetone of an acetone-soluble zinc salt at a pH of about 4.5 to about 7, the acetone volume concentration in said solution being between about 50 percent and about 70 percent and the concentration of said zinc salt being between about 0.4 and about 1 molar, separating a first precipitate from the mixture, cooling the mother liquor remaining after removal of said first precipitate to a temperature of between about −15° C. and −30° C., separating a second precipitate from the mixture and adding acetone to the mother liquor remaining after removal of said second precipitate to raise the acetone concentration to at least 90 percent by volume to form a third precipitate constituting a zinc complex of purified relaxin.

33. A method according to claim 32 wherein said fraction is mixed with said solution at a temperature of about 25° C.

34. A method according to claim 32 wherein the acetone volume concentration in said solution is 60 percent, the concentration of said zinc salt is 0.6 molar and the pH of said solution is 5.6.

35. A method according to claim 32 wherein said zinc salt is zinc chloride.

36. A method according to claim 32 wherein said second precipitate is treated at a temperature of less than 0° C. with a mixture of aqueous hydrochloric acid and acetone, the acid normality of said mixture being about 0.07 to about 0.7 and the acetone volume concentration being between 77 percent and 82 percent, the precipitate which forms is separated and the mother liquor remaining is treated with acetone in an amount sufficient to raise the acetone volume concentration to at least 90 percent, thereby precipitating a relaxin fraction therefrom.

37. A method according to claim 32 wherein said third precipitate is treated with a mineral acid to regenerate purified relaxin from said complex.

38. A method according to claim 37 wherein said mineral acid is aqueous hydrochloric acid having a normality of at least 2.

39. A method of purifying an impure relaxin fraction which comprises dissolving said fraction in water, adding to said solution a phosphorylated carbohydrate in the amount of about 25 percent to about 40 percent of the amount required totally to precipitate relaxin from said solution, and separating the precipitate which forms constituting a complex of purified relaxin with said phosphorylated carbohydrate.

40. A method according to claim 39 wherein said phosphorylated carbohydrate is a phosphorylated derivative of a member selected from the group consisting of non-reducing di-saccharides and non-reducing tri-saccharides.

41. A method according to claim 39 wherein said phosphorylated carbohydrate is phosphorylated sucrose.

42. A method according to claim 39 wherein said phosphorylated carbohydrate is phosphorylated raffinose.

43. A method according to claim 39 wherein the solution of said fraction in water is adjusted in pH to about 3 and said phosphorylated carbohydrate is added to said solution as a solution at a pH of about 3 containing about 1 to about 5 percent by weight of said phosphorylated carbohydrate.

44. A method of fractionating an impure relaxin fraction into a plurality of sub-fractions of varying relaxin potency which comprises dissolving said fraction in water and adding to the solution a plurality of portions of a phosphorylated carbohydrate in such a way that each precipitated sub-fraction constituting a phosphorylated carbohydrate-relaxin complex is removed from the solution before the addition of the next succeeding portion.

45. A method of recovering purified relaxin from animal ovaries which comprises extracting the ovaries with a dilute aqueous mineral acid, adding sufficient acetone to provide an acetone concentration of between about 70 and about 85 percent by volume, separating the tissue residue from the mixture to yield an acid-acetone extract, adding water to said extract in an amount sufficient to reduce the acetone concentration to about 30 to about 40 percent by volume, adding an excess of a phosphorylated carbohydrate to the diluted extract, separating therefrom the precipitate constituting a phosphorylated carbohydrate-relaxin complex, suspending said complex in a liquid medium selected from the group consisting of water and mixtures of water and acetone containing up to 60 percent acetone by volume, treating said suspension with concentrated hydrochloric acid in an amount sufficient that the resulting mixture contains about 6.5 to about 8.5 equivalents of hydrogen ion per liter of water present in said mixture, adding a precipitating agent selected from the group consisting of trichloroacetic acid when said liquid medium is water and acetone when said liquid medium is selected from the group consisting of water and mixtures of water and acetone containing up to 60 percent acetone by volume, separating the precipitate which forms comprising crude relaxin, mixing said crude relaxin at a temperature of less than 0° C. with a mixture of an aqueous mineral acid and acetone having an acid normality of about 0.07 to about 0.7 and an acetone volume concentration between 77 and 82 percent, separating the precipitate which forms, increasing the acetone concentration of the liquid phase to at least 90 percent by volume to precipitate a partially purified relaxin fraction therefrom, mixing said partially purified relaxin fraction at a temperature between about 30° C. and about 5° C. with a solution in aqueous acetone of an acetone-soluble zinc salt at a pH of about 4.5 to about 7 and having an acetone volume concentration of about 50 to about 70 percent and a molar concentration of said zinc salt between about 0.4 and about 1 molar, separating the precipitate, cooling the liquid phase to a temperature of between about −15° C. and about −30° C., separating the precipitate which forms, adding acetone to the liquid phase to raise the acetone concentration thereof to at least 90 percent by volume, separating the precipitate constituting a zinc complex of purified relaxin, and treating said zinc complex with aqueous hydrochloric acid to regenerate purified relaxin from said complex.

46. A method according to claim 45 wherein the precipitate which forms upon cooling said aqueous acetone-relaxin-zinc salt solution to about −15° C. to about −30° C. is treated at a temperature of less than 0° C. with a mixture of aqueous hydrochloric acid and acetone having an acid normality of about 0.07 to about 0.7 and an acetone volume concentration of 77 percent to 82 percent, the precipitate which forms is separated, the liquid phase is treated with acetone in an amount sufficient to raise the acetone volume concentration to at least 90 percent, the resulting precipitate is dissolved in water, a phosphorylated carbohydrate is added to the so-formed aqueous solution in the amount of about 25 percent to about 40 percent of the amount required totally to precipitate rleaxin therefrom, the resulting precipitated phosphorylated carbohydrate-relaxin complex is separated and mixed with the phosphorylated carbohydrate-relaxin complex obtained from the acid-acetone extract of said ovaries.

References Cited in the file of this patent

UNITED STATES PATENTS

| | | |
|---|---|---|
| 1,692,509 | Merki | Nov. 20, 1928 |
| 2,174,862 | Sahyun | Oct. 3, 1949 |
| 2,852,431 | Kroc et al. | Sept. 16, 1958 |
| 3,008,878 | Keck et al. | Nov. 14, 1961 |